United States Patent [19]

Watanabe et al.

[11] Patent Number: 5,047,866

[45] Date of Patent: Sep. 10, 1991

[54] COMB FILTER TYPE LUMINANCE/CHROMINANCE SIGNAL SEPARATION CIRCUIT

[75] Inventors: Katsuyuki Watanabe; Tomomitsu Kuroyanagi, both of Katsuta; Atsushi Yoshioka; Michio Masuda, both of Yokohama; Toshiro Aizawa, Katsuta, all of Japan

[73] Assignee: Hitachi, Ltd., Tokyo, Japan

[21] Appl. No.: 323,841

[22] Filed: Mar. 15, 1989

[30] Foreign Application Priority Data

Mar. 16, 1988 [JP] Japan ................... 63-60335

[51] Int. Cl.⁵ .................. H04N 9/80; H04N 9/78
[52] U.S. Cl. ..................... 358/329; 358/31; 358/36
[58] Field of Search .............. 358/31, 329, 328, 340, 358/36

[56] References Cited

U.S. PATENT DOCUMENTS

| 4,072,984 | 2/1978 | Kaiser | 358/31 |
|---|---|---|---|
| 4,167,021 | 9/1979 | Holmes | 358/31 |
| 4,688,080 | 8/1987 | Wagner | 358/31 |
| 4,703,342 | 10/1987 | Takahashi | 358/31 |
| 4,807,049 | 2/1989 | Fukuda | 358/329 |
| 4,809,085 | 2/1989 | Funahashi | 358/329 |
| 4,855,815 | 8/1989 | Yasuki et al. | 358/31 |

FOREIGN PATENT DOCUMENTS

| 1170760 | 7/1984 | Canada | 358/31 |
|---|---|---|---|
| 0151592 | 8/1984 | Japan | 358/31 |
| 0088989 | 4/1988 | Japan . | |
| 0014998 | 6/1988 | Japan . | |
| 2066615 | 7/1981 | United Kingdom | 358/31 |

OTHER PUBLICATIONS

Maxemchuk et al., Separation of NTSC Signals by Minimum Mean Square Error Filters and Adaptive Filters, IEEE Transactions on Communications, vol. COM-26, No. 5, May 1978, pp. 583–593.
"Videocom", Jul. 1987, pp. 53–57 (no translation).

Primary Examiner—John W. Shepperd
Attorney, Agent, or Firm—Antonelli, Terry, Stout & Kraus

[57] ABSTRACT

A luminance and chrominance signal separation circuit for use in a video tape recorder wherein in the recording mode a three-line comb filter is made to be an adaptive type comb filter for separating a luminance signal from a chrominance signal and in the playback mode the comb filter is made to eliminate residual chrominance signal components in the luminance signal. Switching circuits are provided in the invention to permit the switching of the luminance and chrominance signal separation circuit between recording and playback modes and noise reduction is accomplished by a feedback line correlation circuit.

3 Claims, 6 Drawing Sheets

COMB FILTER TYPE LUMINANCE/CHROMINANCE SIGNAL SEPARATION CIRCUIT

BACKGROUND OF THE INVENTION

The present invention relates to an apparatus in a color television system for separating a composite color signal into a luminance signal and a chrominance signal, and particularly relates to a separation circuit constituted by a comb filter which is suitable for separation of a broad band composite color signal into luminance and chrominance signals.

In a composite color signal of the NTSC system, a chrominance signal having a color subcarrier frequency fsc (fsc=455/2$f_H$·$f_H$ being a horizontal scanning frequency) as a center frequency is superimposed by frequency-interleaving onto a luminance signal of a frequency band of from 0 to 4.2 MHz. In order to separate the chrominance signal and the luminance signals from each other, therefore, a low pass filter (hereinafter abbreviated to "LPF") of 3 MHz and a band pass filter (hereinafter abbreviated to "BPF") having a pass band of about fsc±500 KHz, that is, linear filters, have been used. On the other hand, recently, a technique for performing luminance/chrominance signal separation (hereinafter referred to as "Y/C separation") with a comb filter using a 1 H (H being a horizontal scanning period) delay line has become the main current. The advantage of this technique is that it is possible to expand the band of a luminance signal under the condition that interference between the luminance and chrominance signals is minimized.

Such a comb filter however has a problem in that the Y/C separation cannot be carried out in a portion having no correlation in the vertical direction (between horizontal scanning lines adjacent to each other), that is, in a contour portion of a picture or in a moving image, because addition/subtraction is performed between signals before and after 1 H delay. In a picture scene, generally, dot interference (that is, interference due to mixture of a chrominance signal into a luminance signal circuit) and color bleeding occur in contour line portions in the horizontal direction.

In the Japanese magazine "VIDEOCOM", July of 1987, pp. 53-57, there has been reported a Y/C separation circuit constituted by a two-line comb filter using a single 1 H delay element, in which a signal which could not be separated by a luminance comb filter (a non-correlative portion) is detected, and the comb filter is controlled by the thus obtained detection signal to thereby eliminate dot interference as well as color bleeding in a vertical edge. In a non-correlative portion, the output of the luminance comb filter is made to pass through an fsc-trap, while a chrominance signal output is obtained by making a composite color signal pass through a BPF without using a comb filter. In this conventional technique of detection of a non-correlative portion, a chrominance signal component (a factor of dot interference) included in an output of a luminance comb filter is extracted and the thus extracted chrominance signal component is subject to detection by means of a chrominance comb filter to thereby obtain a non-correlation detection signal. That is, the comb filter is controlled when a component causing interference is detected.

Although the above-mentioned Y/C separation circuit is superior in performance, another 1 H delay line has been required for a non-correlation detection circuit in addition to a 1 H delay line for a Y/C separation comb filter.

SUMMARY OF THE INVENTION

It is an object of the present invention to provide a composite color signal separation circuit constituted by a three-line comb filter using a series connection of two 1 H delay elements in which the delay elements of the comb filter is commonly used also in a detection circuit to detect a non-correlative signal in the vertical direction of a picture scene without using any other delay element, and an arithmetic operation circuit for controlling the output of the comb filter on the basis of the level of the non-correlative signal is provided in each of luminance and chrominance signal comb filter portions, so as to obtain a color television picture with a high resolution without generating any dot interference as well as any color bleeding.

Since a three-line comb filter can perform Y/C separation more accurately than a two-line comb filter, the former can improve the resolution of a picture scene. For example, it is possible to reduce dot interference and color bleeding by half. Further, according to the present invention, in the case where Y/C separation cannot be performed perfectly, a non-correlative signal component in the vertical direction is detected and the comb filter is controlled in accordance with the level of the detected non-correlative signal component so as to remove the influence of the non-correlative signal to thereby eliminate dot interference and color bleeding.

In one embodiment of the present invention, for the separation of a luminance signal, there is provided an arithmetic operation circuit which is arranged to receive an output signal of a luminance signal comb filter and a signal obtained by making the output of the luminance signal comb filter pass through a chrominance signal band component trap filter so that the arithmetic operation circuit add the two input signals at a ratio corresponding to the non-correlation signal (which takes a value of "1" in the case where there is no correlation, takes a value of "0" in the case where there is perfect correlation, and takes a value which varies continuously corresponding to the degree of non-correlation in the case between the above-mentioned cases of non-correlation and perfect correlation). For the separation of a chrominance signal, there is provided another arithmetic operation circuit which is arranged to receive an output signal of a chrominance signal comb filter and a signal (a composite color signal) not passed though the chrominance signal comb filter so that the arithmetic operation circuit add the two input signals at a ratio corresponding to the value of the non-correlation signal. The thus obtained addition signal is applied to a BPF which passes a chrominance signal band so as to obtain a separated chrominance signal. Another embodiment of the present invention provides a Y/C separation circuit for use in a video tape recorder, in which a three-line comb filter is made to be an adaptive type comb filter in a recording mode in the same manner as the above described embodiment. In a playback mode, a front-stage 1 H delay line of two 1 H delay lines is used for noise reduction, and the rear-stage 1 H delay line is used as a two-line comb filter. Noise reduction is achieved by a feedback line correlation circuit in which an output ($V - V_{1D}$) of a first subtracter, that is, a frequency component $\frac{1}{2} f_H$ away from a luminance signal is made to pass a limiter and an attenuator and then is subtracted from a present signal by a second subtracter. Consequently, a background noise in phase in the vertical direction is cancelled. Further, in the two-line comb filter in the succeeding stage of the circuit, addition and subtraction between the outputs $V_0 (= V)$ and $V_1 (= V_{1D})$ of first and second switching circuits, which switch between record and playback modes, are performed by an adder and a third subtracter respectively, and thereafter, the two-line comb filter is the same as the three-line comb filter in the recording mode.

Therefore, this embodiment of the present invention operates as a Y/C separation circuit in the recording mode and operates as a comb filter for eliminating residual chrominance signal components in the luminance signal in the playback mode.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

A Y/C separation circuit using a three-line comb filter has been proposed, for example, as is disclosed in JP-A-63-14998 which has been filed by NEC Home Electronics Ltd. on Dec. 15, 1986 and laid-open on June 22, 1988 after the filing date of the Japanese patent application based on which the convention priority of the present patent application is claimed. In the proposed Y/C separation circuit, three kinds of Y/C separation means are selectively switched in response to non-correlative signals. According to the present invention, however, not only such a discontinuous switching control as performed in the proposed Y/C separation circuit but also a continuous control of the output of a comb filter in accordance with a continuously variable value of a non-correlative signal can be performed by means of an arithmetic operation circuit.

Figure 1:
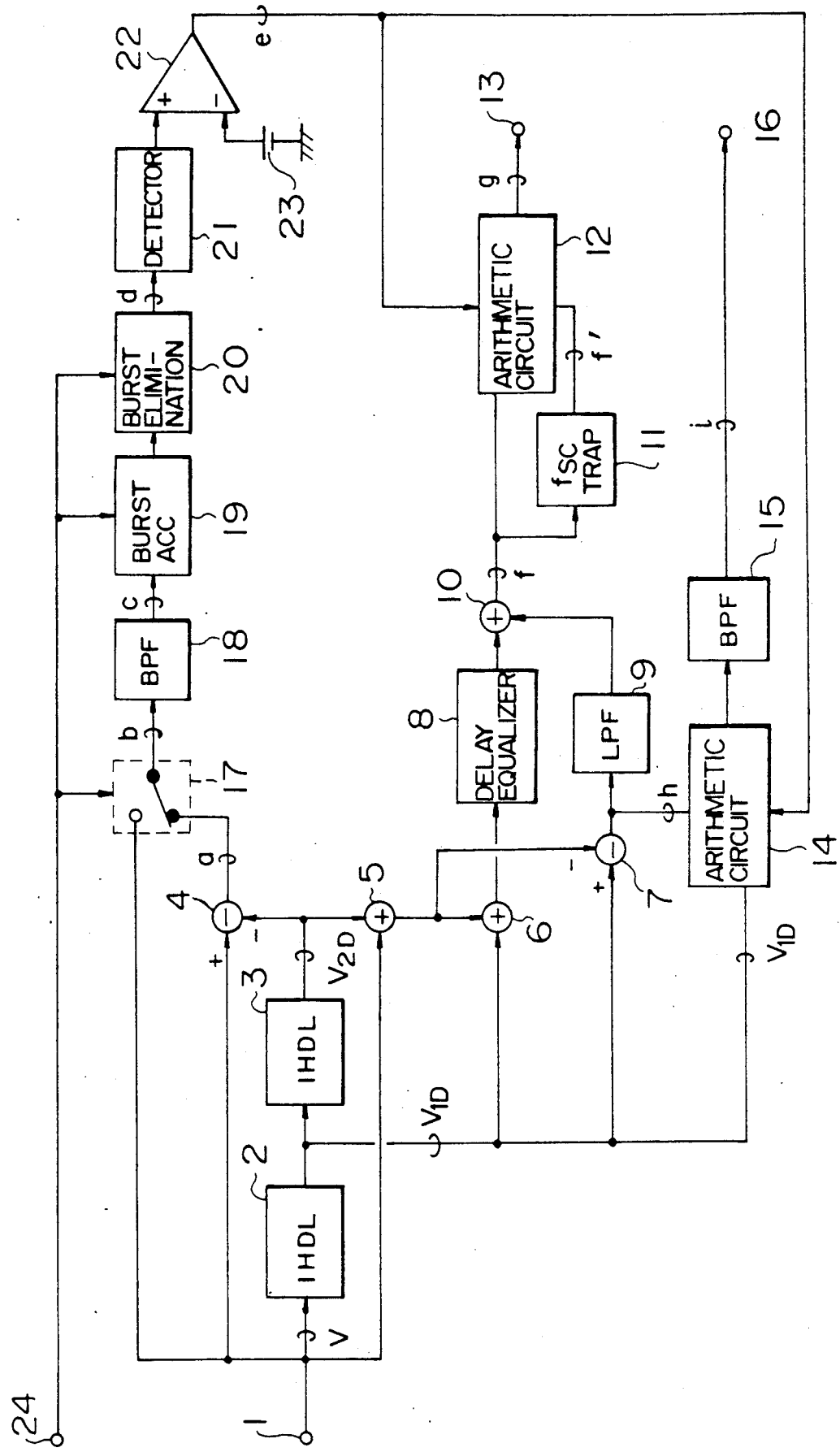
FIG. 1 is a block diagram of a first embodiment of the Y/C separation circuit according to the present invention.

An embodiment of the present invention will be described with reference to FIG. 1. FIG. 1 is a block diagram of an adaptive comb filter which includes 1 H delay lines 2 and 3 constituted by delay elements, for example, charge coupled devices (CCDs) (which are not limited to CCDs but may be digital line memories); adders 5, 6 and 10; subtracters 4 and 7; arithmetic operation circuits 12 and 14; a switching circuit 17; an equalizer 8; an LPF 9; a trap circuit 11; BPFs 15 and 18; a burst ACC (automatic color controller) circuit 19; a burst eliminating circuit 20; a detection circuit 21; an amplifier circuit 22; and a reference voltage source 23.

The 1 H delay lines 2 and 3 are connected in series to an input terminal 1, and a composite color signal V is applied to the input 1. A composite color signal $V_{1D}$ with a delay of 1 H is obtained from a connection point between the delay lines 2 and 3, while a composite color signal $V_{2D}$ with a delay of 2 H is obtained from the output of the delay line 3. The basic principal of a comb filter is in that a luminance signal component can be obtained by adding the signal $V_{1D}$ to the signal V, and a chrominance signal component can be obtained by subtracting the signal $V_{1D}$ from the signal V.

First, a three-line comb filter will be described briefly. Let the outputs of luminance and chrominance comb filters be Gy and Gc respectively. Then, the outputs Gy and Gc are expressed by, $$Gy = \frac{1}{2} V_{1D} + \frac{1}{4} (V + V_{2D}) \qquad (1)$$

$$Gc = \frac{1}{2} V_{1D} - \frac{1}{4} (V - V_{2D}) \qquad (2)$$

Then, the arithmetic operation of the $\frac{1}{4}(V + V_{2D})$, that is, the second term in each of the equations (1) and (2) is performed by the adder 5, the addition of the first and second terms in the equation (1) is performed by the adder 6, and the subtraction of the second term from the first term in the equation (2) is performed by the subtracter 7. The output of the luminance comb filter realized by the equation (1) has a comb characteristic in wide frequency band of a CCD acting as a delay element. Not only a chrominance signal component but also a luminance signal component are therefore eliminated by the comb filter. Consequently, the resolution of a luminance signal in the vertical direction is deteriorated. Accordingly, a low band component in the output of the subtracter 7 is extracted by the LPF 9 and added by the adder 10 to the output of the adder 6 passed the equalizer 8, so as to perform interpolation in the low band so that only the chrominance signal band (fsc±500 KHz) has a comb characteristic, thereby obtaining an output f of the luminance signal comb filter. A this time, the equalizer 8 acts to compensate t e delay time of the LPF 9 so that the respective del y times of the two input signals applied to the add r 10 are made equal to each other.

Figure 2:
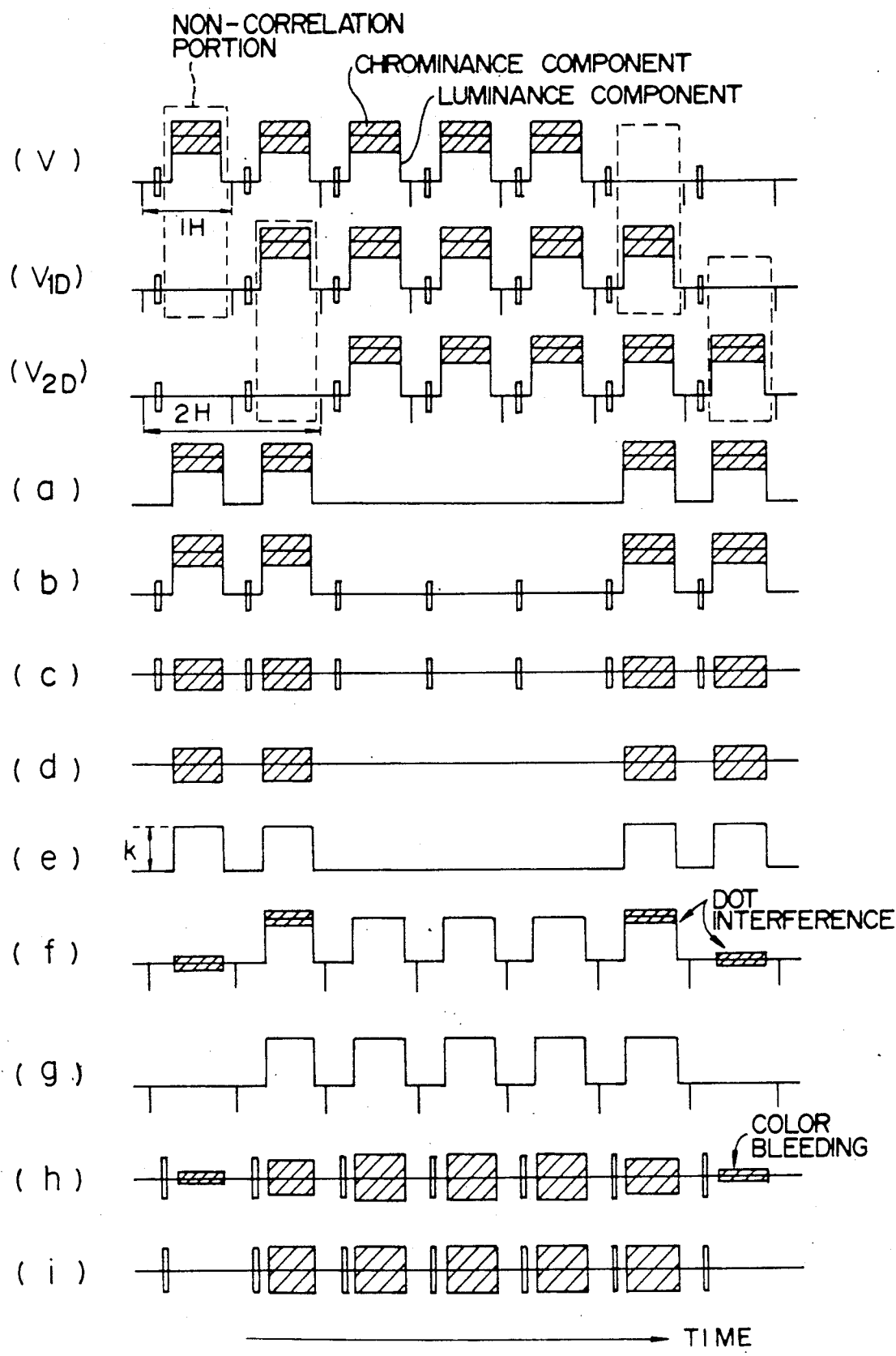
FIG. 2 is a waveform diagram for explaining the operation of the Y/C separation circuit according to the present invention.

In a usual Y/C separation comb filter, the signal f may be used as a luminance signal output, and a signal h subjected to extraction by a BPF is used as a chrominance signal output. If those signals are used as they are, however, as shown in FIG. 2, dot interference occurs in the signal f at non-correlative portions (that is, portions encoded by dotted lines) of a luminance signal as shown, and vertical color bleeding occurs in the chrominance signal h, thereby deteriorating the quality of a picture. In the adaptive comb filter according to the present invention, however, it is possible to obtain a Y/C separation output in which there is no deterioration in picture quality in the vertical direction (dot interference and color bleeding being eliminated), as shown in waveforms g and i in FIG. 2. In FIG. 1, the following arithmetic operation is performed on the luminance signal f and a signal f' which is obtained through the fsc-trap 11 by extracting a 3.58 MHz band component from the signal f, thereby suppressing a dot interference component. Assume that the level of a non-correlation detection pulse e which will be described after is k ($0 \leq k \leq 1$), which indicates the degree of correlation and takes "1" in the case of no correlation and "0" in the case of perfect correlation. The output signal g of the luminance comb filter is given by the equation $g = (1-k)f + kf'$. That is, $g = f$ in the case of perfect correlation (k=0) and g=f' in the case of no correlation (k=1), thereby eliminating dot interference. In the case of 0<k<1, the ratio of addition of the signals f and f' is controlled in accordance with the value of k.

As to a chrominance signal, the arithmetic operation of $(1-k)h + kV_{1D}$ is performed with respect to the output h of the subtracter 7 and the present signal $V_{1D}$ by the arithmetic operation circuit 14 on the basis of the level k of the non-correlation detection pulse e in the same manner as the luminance signal, and only a chrominance band is extracted from the output signal of the arithmetic operation circuit 14 through the BPF 15, so that the chrominance signal i having no vertical color bleeding is put out through an output terminal 16.

Figure 6:
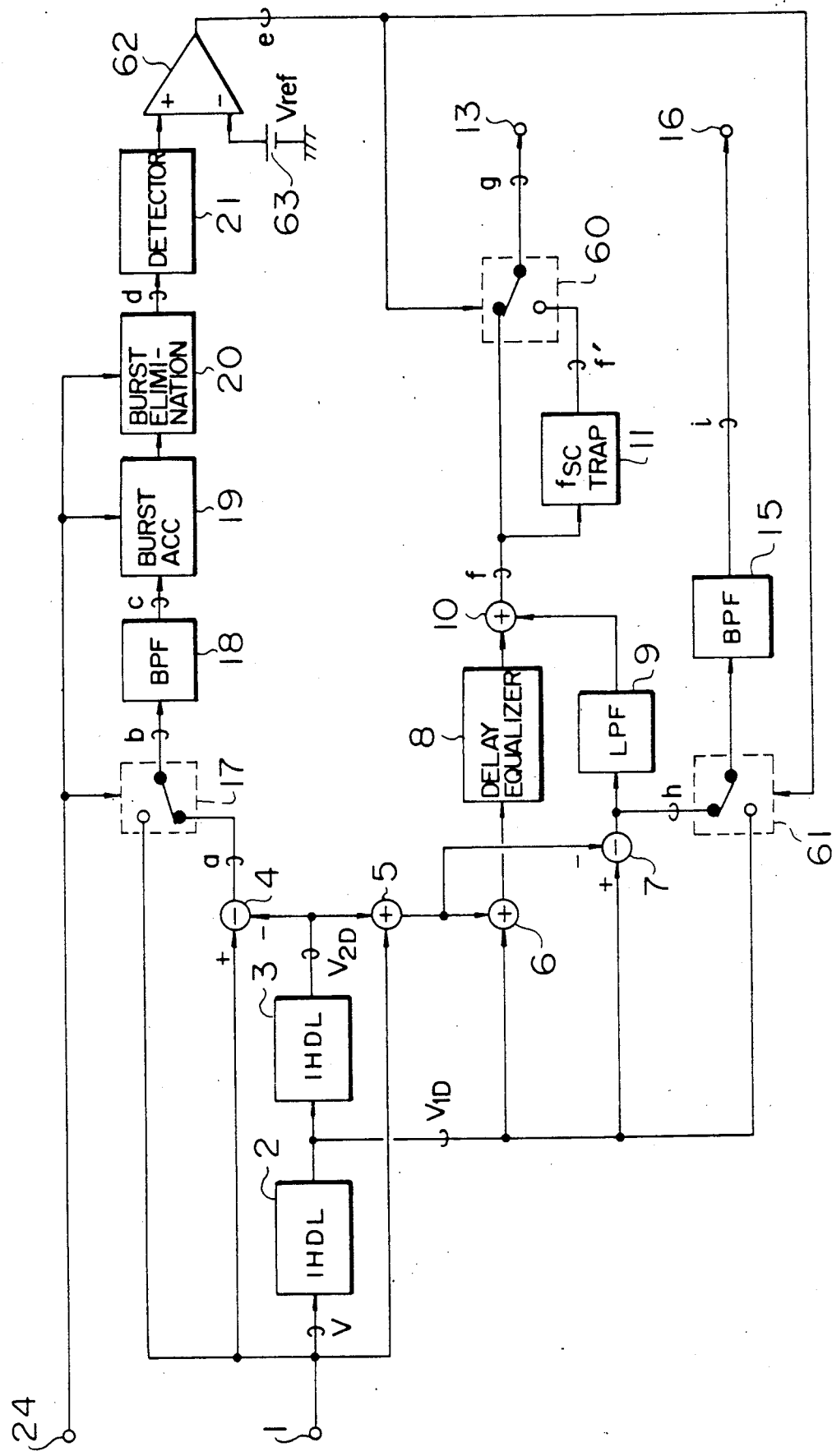

FIG. 6 shows a specific embodiment in which the non-correlation detection pulse e can take only a selected one of binary values k=0 and k=1. In FIG. 6, switching circuits 60 and 61 are connected to a contact-a side in the case of correlation (k=0) and a contact-b side in the case of no correlation (k=1). The reference numeral 62 represents a comparator 62 which compares a detection output of the detector 21 with a voltage $V_{ref}$ (a threshold value) of a reference voltage source 63 so as to put out a signal of k=1 indicating non-correlation when the detection output is over the reference value $V_{ref}$ and put out a signal of k=0 indicating correlation when the detection output is not over the reference value $V_{ref}$.

In the embodiment of FIG. 6, since the non-correlation detection signal k takes only either one of binary values "0" and "1", there is a large difference in picture scene between a signal portion where it is regarded that there exists no correlation (k=1) so that the comb filter is to be controlled and a signal portion where it is regarded that there exists correlation (k=0) in spite of imperfect correlation so that the comb filter is not controlled. That is, there are some cases where the difference between a portion where dot interference is eliminated and a portion where dot interference is not eliminated appear in a picture scene. Moreover, if the reference voltage $V_{ref}$ for the comparator 62 is set to a low value to enlarge the capacity of detection of a non correlation portion, there occurs a possibility of erroneous operation in changing-over the switch 60.

In the embodiment of FIG. 1, on the other hand, the signal k indicating the degree of non-correlation can take a value continuously variable within a range of from 1 to 0, and the addition ratios between the signals f and f' and between the signals h and $V_{1D}$ can be continuously controlled correspondingly to the value of the signal k, so that the elimination of dot interference can be performed in a natural fashion in a picture scene. Further, it is possible to reduce the deterioration in resolution of a luminance signal.

Figure 3:
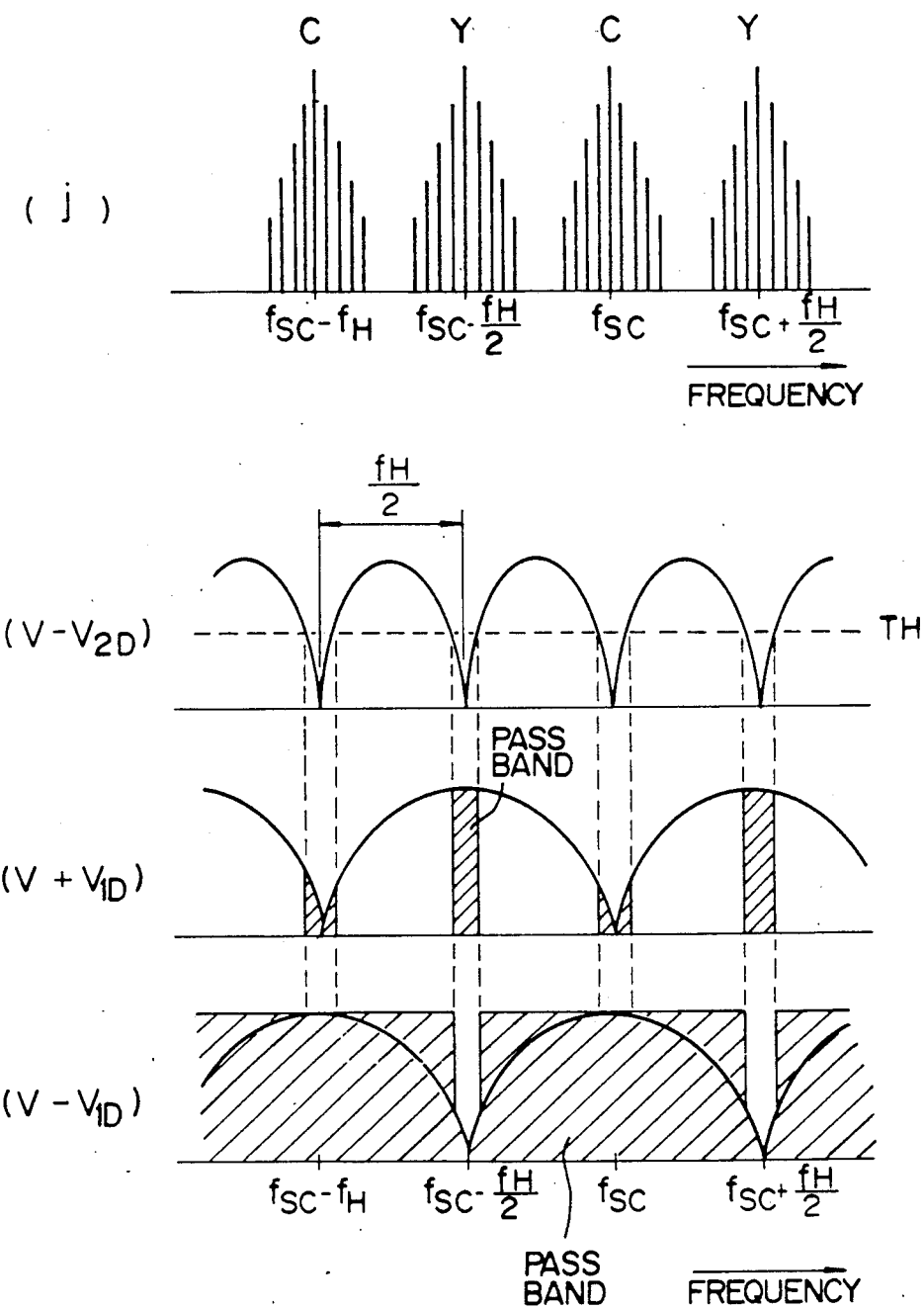
FIG. 3 is a frequency spectrum diagram for explaining the operation of the Y/C separation circuit according to the present invention.

Next, a method of forming a non-correlation detection pulse will be described with reference to FIGS. 1 to 3.

The output signal a of the subtracter 4 corresponds to a difference between a present composite color signal V and a 2H-delayed composite color signal $V_{2D}$. Since the signals before and after 2H-delay are in phase in a portion where there is a vertical correlation with respect to both the luminance and chrominance signals, the signal a is to be obtained by extracting the luminance and chrominance signals in non-correlative portions, as shown in FIG. 2. The signal a is used as a source of a non-correlation detection pulse. Since a burst expands and contradicts in accordance with the level change of a chrominance signal to thereby change the capacity of detection of a non-correlation detection pulse, the burst is extracted from the present signal V and the extracted burst is added to the signal a for only a burst period by the switching circuit 17 to obtain a signal b as an output of the switching circuit 17. A chrominance band is extracted from the thus obtained burst-added signal b by the BPF 18 to obtain a signal c. The burst signal in the signal c is made constant by the burst ACC circuit 19, and then the burst signal is eliminated by the burst eliminating circuit 20 to thereby obtain only a chrominance band component d at a non-correlative portion subjected to ACC.

The thus extracted signal d is subject to detection in the detection circuit 21 and a difference between the thus obtained detection signal and the reference voltage $V_{ref}$ of the reference voltage source 23 is amplified by the amplifier circuit 22 to thereby obtain the non-correlation detection pulse e. As seen from FIG. 2, the position of the detection pulse e corresponds to a dot component in the signal f and a color bleeding portion in the signal h, and it is therefore possible to control an adaptive comb filter. At this time, the signal externally supplied through a terminal 24 is a burst-gate pulse for indicating the position of a burst signal.

The above description will be considered on an axis of frequency. FIG. 3 shows various relations with respect to a frequency. In the NTSC system, as has been well known, a luminance signal (Y) and a chrominance signal (C) are interleaved at regular intervals of $\frac{1}{2}f_H$. Further, signals are distributed around the luminance signal (Y) and the chrominance signal (C) at regular intergals of a field frequency 60 Hz. As is shown in the diagram $(V+V_{1D})$ of FIG. 3, although it is possible to eliminate the chrominance signals which exist at the regular intervals of $f_H (..., fsc-f_H, fsc, fsc+fH, ...)$ by means of an ordinary comb filter, it is impossible to eliminate the components existing at the intervals 60 Hz, that is, the vertical edge components by means of such an ordinary comb filter, resulting in dot interference. Therefore, a component of the output of the luminance comb filter $(V+V_{1D})$ is eliminated by a trap in a section not lower than the predetermined threshold value $V_{ref}$ of the output of the comb filter having troughs every $\frac{1}{2}f_H$ as shown in the diagram $(V-V_{2D})$ of FIG. 3, while admitting only a shadowed portion shown in the diagram $(V+V_{1D})$ of FIG. 3. Thus, it is possible to eliminate dot interference. As to the output $(V-V_{1D})$ of the chrominance comb filter, if a present signal is made to pass in the above-mentioned section not lower than the reference value $V_{ref}$, the band of a shadowed portion shown in diagram $(V-V_{1D})$ of FIG. 3 is made a pass band.

As has been described above, according to the present invention, two CCD 1H-delay lines are used to constitute a three-line comb filter, and a non-correlation detection pulse is produced by using the three-line comb filter, thereby making it possible to realize a high performance of a Y/C separation circuit and to improve a cost merit by the effective use of the 1H-delay lines.

Figure 4:
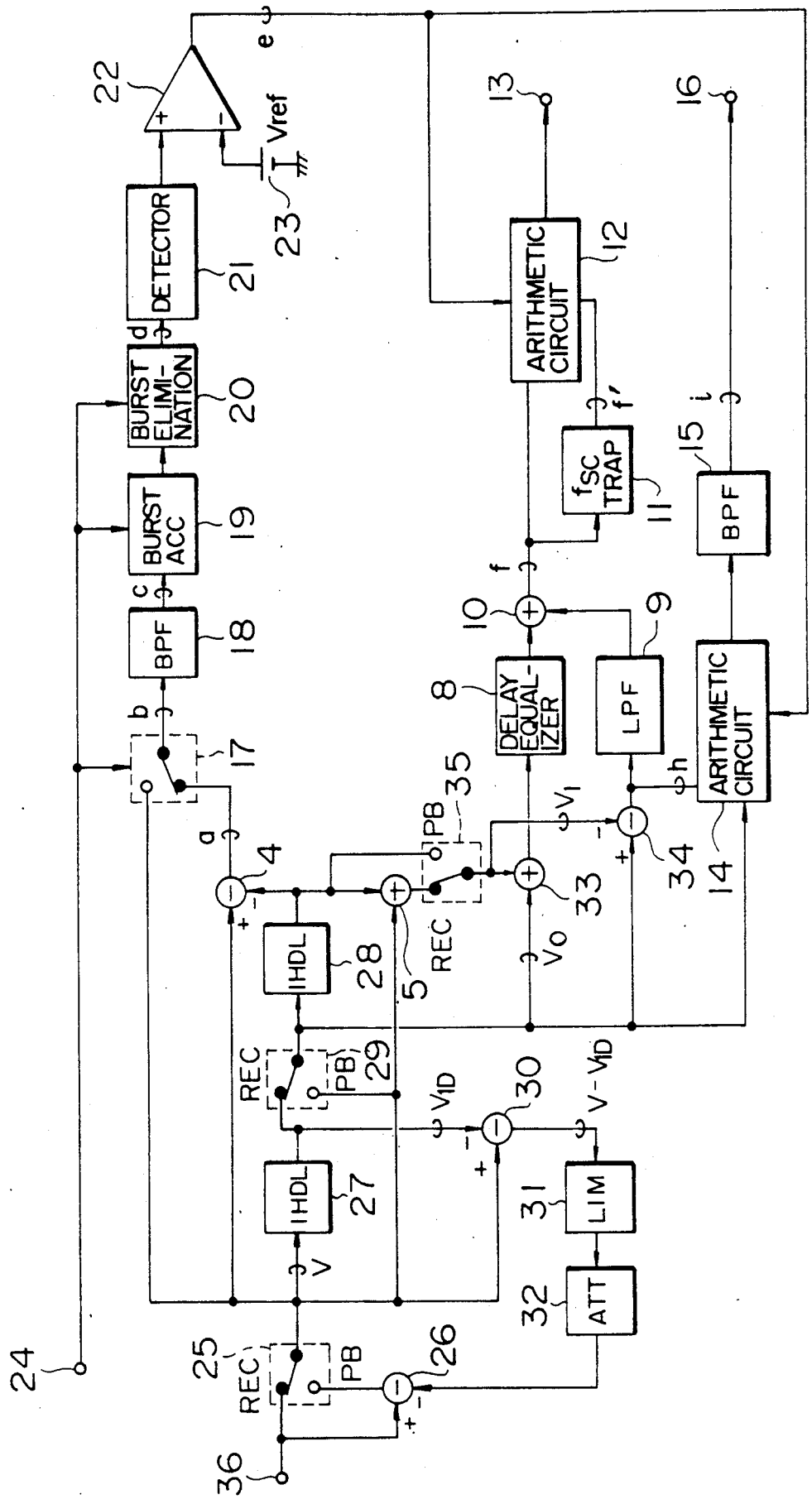
FIGS. 4, 5 and 6 are block diagrams of second, third and fourth embodiments of the Y/C separation circuit according to the present invention respectively.

Next, a second embodiment of the present invention will be described with reference to FIG. 4. The reference numerals 25, 29 and 35 represent switching circuits; 26, 30 and 34 represent subtracters: 33 represents an adder; 27 and 28 represent 1 H delay lines constituted by CCDs; 31 represents a limiter; and 32 represents an attenuator. Other parts are the same as those in FIG. 1 and therefore referenced correspondingly.

This embodiment relates to a Y/C separation circuit for use in a video tape recorder, in which a three-line comb filter is made to be an adaptive type in a recording mode in the same manner as that in the embodiment of FIG. 1. In a state in which the switching circuits 25, 29 and 35 are connected to a REC side (in the recording mode), therefore, the flow of signal is the same as that in FIG. 1. In a playback mode, the front-stage CCD 27 of the two CCDs is used for noise reduction, and the rear-stage CCD 28 is used as a two-line comb filter. This circuit operates as a Y/C separation circuit in the recording mode and operates as a comb filter for eliminating residual chrominance signal components in the luminance signal in the playback mode. Noise reduction is achieved by a feedback line correlation circuit in which an output $(V - V_{1D})$ of the subtracter 30, that is, a frequency component $\frac{1}{2}f_H$ away from a luminance signal is made to pass through the limiter 31 and the attenuator 32 and then is subtracted from a present signal by the subtracter 26. Consequently, a background noise in phase in the vertical direction is canceled. Further, in the two-line comb filter in the succeeding stage, addition and subtraction between the outputs $V_o(=V)$ and $V_1(=V_{1D})$ of the switching circuits 29 and 35 are performed by the adder 33 and the subtracter 34 respectively, and thereafter, the two-line comb filter is the same as the three-line comb filter in the recording mode.

As has been described above, in this embodiment, the switching circuits 25, 29 and 35 are changed over between the recording and playback modes. In the recording mode, the two 1 H-delay lines 27 and 28 are used for both the three-line comb filter and the noncorrelation detection, and in the playback mode the front-stage 1 H delay line 27 forms a noise reduction circuit and the rear-stage 1 H delay line 28 constitutes a two-line comb filter which is used to eliminate a chrominance component in a luminance signal which could not be eliminated in recording.

Next, a third embodiment of the present invention will be described with reference to FIG. 5. In this embodiment, circuits for forming non-correlation detection pulses for controlling luminance and chrominance comb filters are provided independently of each other. The delay time of the BPF 18 in FIG. 1 generates a delay in controlling the switching circuit 12 so that there remains dot interference corresponding to the delay. To avoid this, it will do to shorten the delay time of the BPF 18 as small as possible. With respect to the control of the chrominance comb filter, on the other hand, if the band of the BPF 18 is broad, the signal $V_{1D}$ may pass the arithmetic operation circuit 14 correspondingly, so that a cross color (a phenomenon that a luminance signal of an fsc band is subject to a chrominance signal processing so that a picture scene is colored) is produced by a luminance signal in a chrominance signal. In order to reduce this phenomenon of cross color, the band of the BPF 18 should be made narrow. The delay time is however increased by making the band narrow, so that a delay occurs in elimination of dot interference in the arithmetic operation circuit 12 as described above. It is therefore necessary to establish the band and delay time of the BPF to make a compromise between the rate of dot elimination and the production of a cross color.

Figure 5:
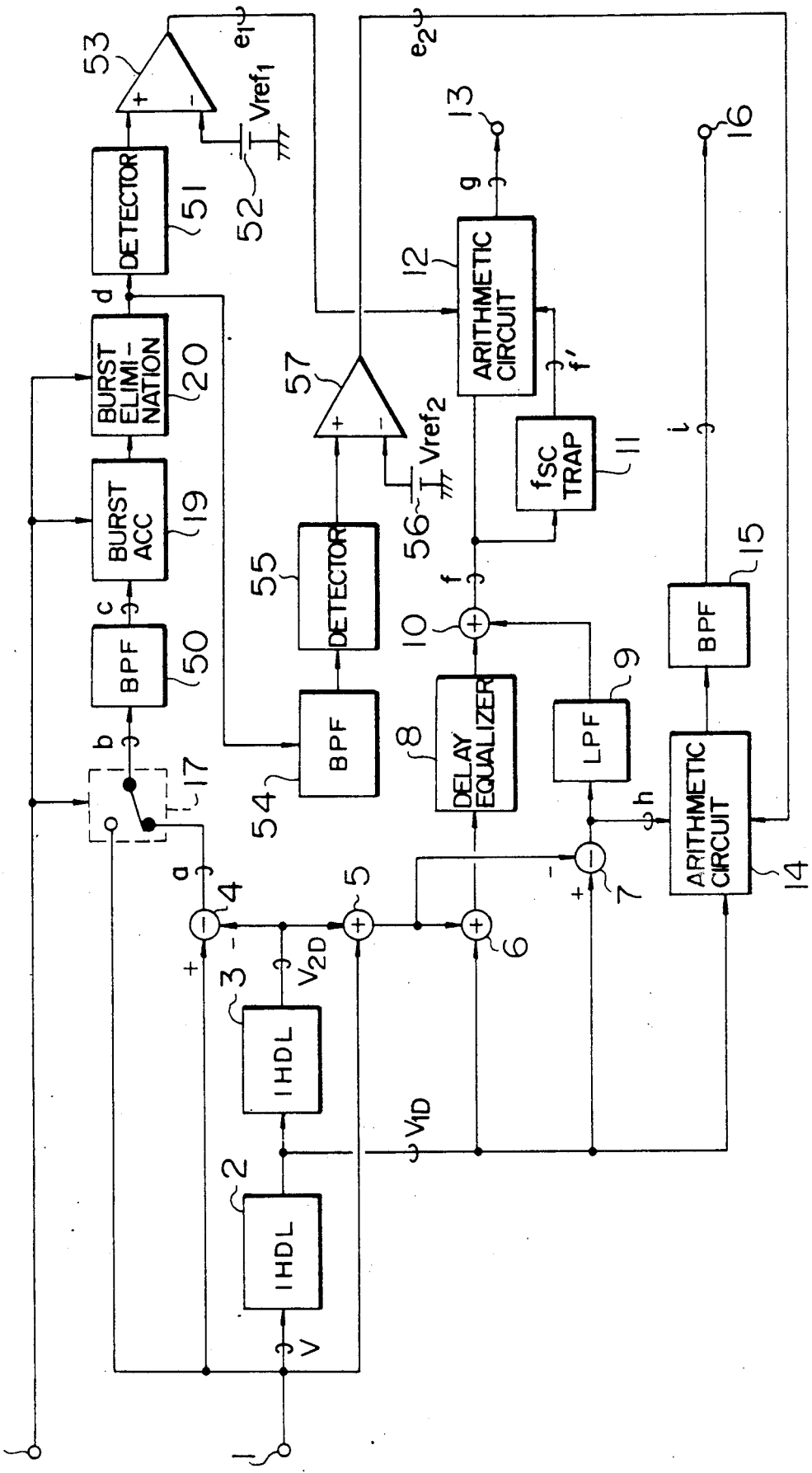

In the embodiment of FIG. 5, as to a non-correlation detection pulse ($e_1$) for controlling the arithmetic operation circuit 12, a BPF 50 with a broad band and a little delay time is used, and the detection pulse ($e_1$) is formed by a detector 51 and an amplifier 53 to thereby suppress the delay time to a minimum and reduce dot interference to the utmost. As to a non-correlation detection pulse ($e_2$) for controlling the arithmetic operation circuit 14, on the other hand, a BPF 54 (for example, a BPF with a response of about $-10$ dB at fsc$\pm 500$ KHz) extracts a burst-eliminated signal d, and the detection pulse ($e_2$) is formed by a detector 55 and an amplifier 57 to thereby suppress a cross color.

According to the present invention, a three-line comb filter having a high performance as a Y/C separation comb filter is constituted by two CCD delay elements, and a non-correlation detection pulse is formed by a signal of a difference between signals before and after 2H delay, so as to realize an adaptive comb filter for preventing dot interference and vertical color bleeding from occurring at a vertical edge.

Further, according to an embodiment of the present invention, since addition operations between the respective outputs of a luminance comb filter and a trap circuit and between the respective outputs of a chrominance comb filter and a composite color signal are controlled corresponding to the degree of correlation (k), it is possible to eliminate dot interference in a natural fashion and to prevent the resolution from being deteriorated due to the deterioration of a luminance signal.

Moreover, according to another embodiment of the present invention, two CCD delay elements are used for the above-mentioned adaptive comb filter in recording and used for noise reduction as well as for a two-line comb filter in playback, so that it is possible to use the two CCD delay elements effectively.

Moreover, according to a further embodiment of the present invention, through controlling luminance and chrominance comb filters independently of each other by two types of non-correlation detection pulses, it is possible to obtain a Y/C separation output with a high picture quality with less vertical dot remains and with less cross color.

We claim:

1. A separation circuit of a comb filter type for use in a video tape recorder and for separating a composite color signal V composed of a luminance signal Y and a chrominance signal C, which are multiplexed through two-frequency interleaving, into said luminance signal Y and said chrominance signal C, said separation circuit comprising:

a delay circuit including a pair of first and second delay elements each for giving said composite color signal V a propagation delay time equal to one horizontal scanning period, and said first and second delay elements being connected in series to each other in a recording mode so that said composite color signal V is applied to one end of the series connection of said first and second delay elements and delayed output signals $V_{2D}$ and $V_{1D}$ are obtained from the other end of said series connection and a connection point between said first and second delay elements, respectively;

a first arithmetic operation circuit for receiving said color composite signal V and said delayed output signals $V_{1D}$ and $V_{2D}$ from said delay circuit, and for calculating an output signal $Y = \frac{1}{2}(V_{1D}) + \frac{1}{4}(V + V_{2D})$ corresponding to said luminance signal Y and another output signal $C=\frac{1}{2}((V_{1D})-\frac{1}{4}(V+V_{2D})$ corresponding to said chrominance signal C so as to output said output signals Y and C;

a second arithmetic operation circuit for receiving said color composite signal V and said delayed output signal $V_{2D}$ from said delay circuit, and for calculating a difference signal $(V-V_{2D})$ so as to output said difference signal;

detection means for extracting a frequency component of a chrominance signal band from said difference signal from said second arithmetic operation circuit and for comparing the level of said frequency component with a reference value to thereby obtain a signal $k(0<k<1)$ indicating non-correlation between said composite color signal V and said delayed output signal $V_{2D}$;

filter means for removing a component of said chrominance signal band from said output signal Y of said first arithmetic operation circuit to thereby obtain an output signal Y' including no component of said chrominance signal band;

a third arithmetic operation circuit for receiving said output signal Y of said first arithmetic operation circuit, said output signal Y' of said filter means and said signal k indicating non-correlation between said composite color signal V and said delayed output signal $V_{2D}$ and for caculating $(1-k)Y+kY'$) so as to output the result of calculation as a luminance signal;

a fourth arithmetic operation circuit for receiving said delayed output signal $V_{1D}$ of said delay circuit, said output signal C of said first arithmetic operation circuit and said signal k indicating non-correlation, and for calculating $(1k)C+kV_{1D}$ so as to output the result of calculating as a chrominance signal;

a noise reduction filter including said first delay element and a feedback circuit which feeds back the output of said first delay element to the input so as to reduce common phase background noise in signals between adjacent horizontal scanning lines in a playback mode; and a fifth arithmetic operation circuit which receives the composite color signal V and said output signal $V_{1D}$ to calculate $Y=\frac{1}{2}(V+V_{1D})$ and output the signal Y, where said second delay element receives the output of said noise reduction filter, in the playback mode, to thereby obtain an output luminance signal including no component of said chrominance signal band.

2. A separation circuit according to claim 1, in which said detection means includes a band pass filter for extracting the frequency component of said chrominance signal band from said difference signal, a detector for detecting the level of said frequency component, and an amplifier having two inputs supplied with an output of said detector and said reference value respectively so that said amplifier puts out a signal corresponding to a difference between said two inputs thereof as said signal k indicating non-correlation.

3. A separation circuit according to claim 2, in which said filter means includes a trap circuit for removing a component of a subcarrier frequency band of said composite color signal v, and in which said third and fourth arithmetic operation circuits receive said signal k indicating non-correlation commonly applied from said detection means.

* * * * *